July 27, 1937.  S. L. HANDFORTH  2,088,057
PRODUCTION OF NITRIC ACID FROM OXIDES OF NITROGEN
Filed March 3, 1932
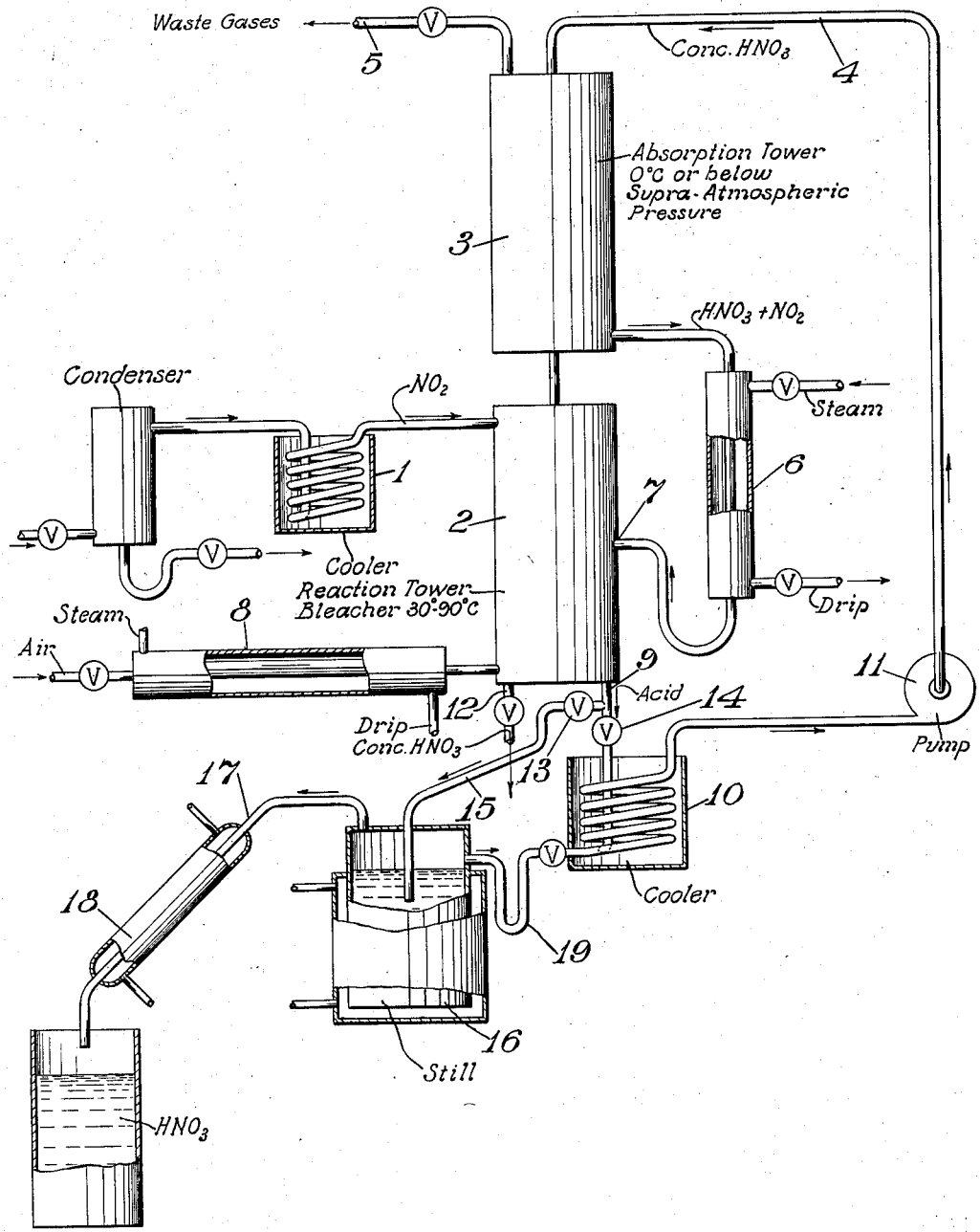
Stanley L. Handforth  INVENTOR.
BY Benton A. Bull
ATTORNEY.

Patented July 27, 1937

2,088,057

UNITED STATES PATENT OFFICE 2,088,057

PRODUCTION OF NITRIC ACID FROM OXIDES OF NITROGEN

Stanley L. Handforth, Woodbury, N. J., assignor to E. I. du Pont de Nemours & Company, Wilmington, Del., a corporation of Delaware Application March 3, 1932, Serial No. 596,419

15 Claims. (Cl. 23—160)

This invention relates to the manufacture of nitric acid from gases containing oxides of nitrogen. It more particularly relates to a process of making strong nitric acid from gases containing oxides of nitrogen, and especially those produced by the oxidation of ammonia with air.

When oxidizing ammonia to oxides of nitrogen and thence to nitric acid ammonia and air are passed through a catalyst where it is oxidized to form oxides of nitrogen and water. In the customary process as heretofore carried out, these gases are then cooled and the water and some of the oxides of nitrogen condensed. The remaining gases are then passed onto an absorption system where they are scrubbed countercurrent with water, the condensate being fed to the absorption system at a suitable point, depending on its acid strength. Water is fed to the end of the absorption system and the inert gases, nitrogen, some oxygen and some unabsorbed nitric oxides are vented from the end of the system. As originally carried out at atmospheric pressure, it is not possible to make acid by this method stronger than 50 to 60% $HNO_3$. Where the process is carried out under about 10 atmospheres pressure, acid of 60 to 70% strength may be made. Even if no additional water were fed to the system but all the oxides were absorbed in the water formed in the reaction, acid of very little over 75% strength only could be made.

As most of this acid is used in the form of 90% or stronger acid, many attempts have been made to produce this strength directly without having to put it through a subsequent concentrating step using a dehydrating agent. In one of these processes the water of reaction is condensed out in such a way as to contain as little oxides of nitrogen as possible and the oxides are then cooled and condensed, mixed with nitric acid and oxidized with nearly pure oxygen under pressure. If it is attempted to use air in this type of process the inert gases build up in the system and prevent its operation. In order to carry out this process satisfactorily the oxidation of the ammonia also has to be carried out with nearly pure oxygen instead of air. This process has several disadvantages and the cost of obtaining nearly pure oxygen greatly increases the final cost of the nitric acid. Also it is a batch process which entails additional operating costs.

The present invention comprises a continuous process by which nitric acid of 70% strength or higher, may be made directly from ammonia oxidation converter products or other gases containing nitric oxides and in which air suffices for the oxidizing medium rather than the substantially pure oxygen. In absorbing the oxides of nitrogen in nitric acid to form acid of strengths below 70%, it has been found advantageous to maintain the temperature as low as possible so as to obtain the strongest acid and the maximum rate of reaction. Contrary to this, I found that with acids above 70% in strength it is desirable to maintain the system in which the reaction is taking place at a temperature of from 30° to 90° C., preferably 60° to 70° C.

I have also found that under these conditions strong acid may be obtained only if the partial pressures of both the nitric oxide and oxygen are maintained sufficiently high. However, it is essential that both the partial pressures be sufficiently high, otherwise only partial realization of the increase in strength will be obtained. When it has heretofore been attempted to do this in a continuous process, large amounts of oxides of nitrogen have been carried out with the excess air and inert gases and these had to be absorbed in water, otherwise an excessive loss of oxides of nitrogen resulted. When these were heretofore absorbed in water this water diluted the acid so that it was impossible to obtain the desired strong acid. I have now found that the oxides of nitrogen may be more efficiently absorbed by scrubbing them with strong acid and that if the pressure is maintained sufficiently high and the temperature sufficiently low in this absorption part of the system the loss of oxides of nitrogen will be reduced to a very low amount.

In carrying out my process the gases containing oxides of nitrogen such as those produced by the catalytic oxidation of ammonia, are cooled to approximately atmospheric temperatures. If the gases have been produced by the oxidation of ammonia and it is desirable to make acid stronger than 70 to 80% some of the water of reaction is condensed out in a specially designed condenser described in my copending application, Serial No. 571,349, filed Oct. 27, 1931, now Patent 2,019,533 issued Nov. 5, 1935, which will remove the water without removing any substantial amounts of nitric acid. However, if acid of only 70 to 80% strength is to be made, this condensate does not need to be separated from the gases unless otherwise desired. The gases are then compressed to from 5 to 50 atmospheres unless they have already been produced by the oxidation of ammonia under this increased pressure as has been suggested in the copending application of G. B. Taylor, Serial No. 422,278, filed January 21, 1930.

The process is shown diagrammatically in the single figure of the drawing, which illustrates one embodiment of my invention. The gas and liquid from cooler 1 enter the top of counter-current absorption and reaction tower 2. The liquid flows down this tower acting as an absorption agent. The gas leaves the top of this tower and enters the bottom of counter-current absorption tower 3, and passes upward through it. This tower 3 is strongly cooled and the gas passing up through it is cooled to approximately 0° C. or below, and is scrubbed by the strong acid made in the lower part of the system which is recirculated and enters tower 3 through pipe 4. The tail gases containing only a minimum of residual oxides of nitrogen leave through pipe 5. The acid flowing down column 3 absorbs the oxides of nitrogen from the gas and leaves the bottom of column 3 containing a large proportion of oxides of nitrogen. This is heated in the heater 6 and enters the middle of absorption column 2 at point 7. Additional air, or oxygen when available, is heated and enters the bottom of column 2 through pipe 8. This oxygen or air passing up through the scrubbing tower counter-current to the acid flowing down bleaches the acid and oxidizes the oxides of nitrogen entering at 7 to form strong nitric acid substantially free of oxides of nitrogen. The excess oxygen or air is scrubbed in the upper part of column 2 with the condensate or make-up water entering the top of the column. These gases carrying unabsorbed oxides of nitrogen then enter tower 3 along with the original gases. This section 2 of the reaction system is maintained at an elevated temperature of approximately 30 to 90° C. Some of the acid is withdrawn through pipe 9, cooled in cooler 10, and pumped to the top of absorption column 3 as previously described, by means of pump 11. The remaining acid made in the system may be withdrawn through pipe 12. In this way, it is possible to obtain much higher partial pressures of oxygen and oxides of nitrogen in the reaction zone in column 2 than can be obtained by any previously suggested continuous system. The gases from the ammonia oxidation converter entering the top of column 2 are depleted in oxygen and if they were allowed to pass through column 2, as has heretofore been done, they would dilute gases in this column and greatly reduce the partial pressures of the reacting products. The solubility of the oxides of nitrogen is greater in strong acid than in weak so that by circulating strong acid over the absorption column 3 it is possible to absorb the oxides of nitrogen even more efficiently than can be accomplished by scrubbing them with water. In this way it is possible to introduce into the reaction column 2 through pipe 7, a mixture of strong nitric acid containing a high proportion of oxides of nitrogen.

In this manner strong nitric acid may be made with the minimum of power for increasing the pressure and with minimum loss of oxides of nitrogen from the absorption system. For example, by operating at 8 atmospheres total pressure, it is possible to introduce the total products of reaction from the ammonia oxidation converter through cooler 1 and by maintaining the absorption column 3 at —5° C. and column 2 at 70° C. and introducing air to the bottom of the column 2 to obtain 75% or stronger nitric acid with a loss through exit 5 of only about 2% of the oxides entering the system. The absorption efficiency may be increased by decreasing the temperature of column 3 or by increasing the pressure, but with increased pressure it is not necessary to maintain column 3 at such a low temperature. Also by increasing the pressure it is possible to make stronger acid, for example, up to 90% strength. Thus at 50 atmospheres it would be necessary only to cool column 3 to about 10° C. and by removing the water of reaction from ammonia oxidation converter products before the gases enter cooler 1, it is possible to make acid of 80 to 90% strength or even higher.

While I have given, in the foregoing, results obtained at various low temperatures, I have preferably maintained the temperature of the absorption column within the range 10° C. to —20° C.

The reaction or absorption towers 2 and 3 may be of any desired type of counter-current scrubbing column, such as, for instance, one packed with chemical-ware rings, or they may be columns of the bubbler plate type. They may or may not contain catalytic material to promote the absorption and oxidation reactions. The gases containing the oxides of nitrogen may enter the bottom of absorption tower 3 instead of the top of tower 2. If any large amount of liquid is condensed in these gases, it is preferable, although not essential, that it be separated from the gases in this case and introduced at the top of tower 2. In this way it may react with the oxides passing upward through tower 2 and be converted to fairly strong acid before it joins with the acid in the tower 3, entering through pipe 7.

Where acid stronger than 80% is to be made it may be desirable instead of directly recirculating acid from the bottom of tower 2 to the top of tower 3 to withdraw all the acid from tower 2 and fractionally distill it to separate it into two fractions. The strong fraction of 80% or higher strength being that for use while the weak fraction of about 70% strength can be returned to the process to the top of tower 3 to be used as the absorbing acid. This may be accomplished by opening the valve 13 and closing the valve 14. The nitric acid will then flow from the tower 2 through the line 15 into a suitable fractionating still 16. The distilled nitric acid passes through the vapor line 17 into the condenser 18, while the residual unvaporized nitric acid flows through the trapped line 19 into the cooler 10, where it is recycled in the system by the pump 11.

As a further modification which can be made of this process, cooler 1 may be omitted or the cooling accomplished in tower 3. Towers 2 and 3 may even preferably be made as one column, the upper part cooled and the lower part heated. In this case it will probably be desirable to trap out at least a portion of the acid from a position corresponding to the joining of these two towers and enter it somewhat lower, corresponding to point 7 in tower 2. The condensate or any necessary additional water may be introduced at a point corresponding to the top of tower 2. Heater 6 may be equally as well constructed as part of tower 2.

It will therefore be seen that many modifications of my invention exist and may be practiced within the scope thereof. Accordingly, I do not intend to be limited in the foregoing description and illustrations except as indicated in the following patent claims.

I claim:

1. The process for making nitric acid from gases containing oxides of nitrogen which comprises passing said gases upward through an absorption column in countercurrent flow with relatively strong, cold nitric acid to absorb said oxides, then passing said solution through a second absorption column countercurrent to a stream of oxygen-containing gases until said acid is substantially free of dissolved oxides of nitrogen, and a part of said oxides have been converted to nitric acid, fractionating the acid from a second absorption column into a still stronger portion and a weaker portion, and returning the weaker portion to the top of the first absorption column to act as the absorbing medium, thereby again increasing the strength of the weaker acid.

2. In an apparatus for making nitric acid from gases containing oxides of nitrogen, a countercurrent absorption and reaction tower comprising an upper absorption section and a lower reaction section, means for removing from the reaction section a portion of the strong acid liquid formed by the absorption of nitrogen oxides in nitric acid, means for cooling said liquid and introducing the same into the absorption section, means for passing the gas from the reaction section to the absorption section, means for removing the liquid from the absorption section, means for warming the liquid, and means for introducing the warmed liquid into the reaction section.

3. In an apparatus for making nitric acid from gases containing oxides of nitrogen, a countercurrent absorption and reaction tower comprising a reaction section and an absorption section, inlet means for introduction of the gases into the absorption section and the accompanying liquid into the reaction section, means for passing the gas from the reaction section into the absorption section, means for removing a portion of the acid from the reaction section, means for cooling the withdrawn acid, means for returning said acid to the absorption section, means for introducing an oxygen-containing gas into said reaction section, means for removing liquid from the absorption section, means for warming the liquid, means for introducing said liquid to the reaction section, means for removing the waste gases from the absorption section, means for cooling the absorption section, means for maintaining the reaction section at an operating temperature, and means for removing acid made in the system from the reaction section.

4. The process of making nitric acid of a concentration higher than 70% strength from gases containing oxides of nitrogen, which process comprises passing said gases, under increased pressure, through an absorption column in counter-current flow with relatively cold, strong nitric acid to absorb said oxides, removing said solution from said column, heating said solution to 30 to 90° C., then further oxidizing the solution by passing it, at increased temperature, counter-current to a stream of air under increased pressure, and cooling and recirculating a part of the strong acid made in the process to absorb the residual nitric oxides from the gas.

5. The process of making nitric acid from gases containing oxides of nitrogen, which comprises absorbing the oxides, under pressure greater than atmospheric, in relatively cold, strong nitric acid, removing said solution from contact with said gases, heating the solution containing said dissolved oxides of nitrogen, then passing said solution counter-current to a compressed gas containing not substantially more than 20% oxygen to convert some of said oxides to nitric acid, and cooling and recirculating a part of the strong acid made in the process to absorb the residual nitric oxides from the gas, whereby to produce nitric acid of a concentration greater than 70% strength.

6. The process of making nitric acid from gases containing oxides of nitrogen, which process comprises absorbing said gases, under pressure, in relatively cold, strong nitric acid maintained at a temperature not lower than —20° C., to produce a solution of oxides of nitrogen in said strong nitric acid, heating said solution of oxides of nitrogen in nitric acid, treating said solution with an oxygen-containing gas consisting substantially of air, whereby to produce nitric acid of a concentration of at least 70% strength, cooling a portion of said strong nitric acid produced in said process, and returning said cooled portion for the absorption of oxides of nitrogen from said air, after passage through said heated solution.

7. The process of claim 6, in which the absorption process is maintained at a pressure of from 5 to 50 atmospheres.

8. The process of claim 6, in which said solution of oxides of nitrogen is heated to a temperature of from 30° C. to 90° C.

9. The process of making nitric acid from gases containing oxides of nitrogen, which process comprises passing said gases, under pressures greater than atmospheric, counter-current to a stream of relatively cold, strong nitric acid maintained at a temperature not lower than —20° C. to absorb said oxides in said nitric acid, heating the resulting solution of oxides of nitrogen in nitric acid, treating said heated solution with an oxygen-containing gas consisting substantially of air, whereby to produce nitric acid of a concentration of at least 70% strength, continuing said treatment with said oxygen-containing gas until said strong nitric acid is at least partially bleached, cooling a portion of said strong nitric acid produced in said process and returning said cooled portion for the absorption of oxides of nitrogen from said air, after passage through said heated solution.

10. The process for making nitric acid from gases containing oxides of nitrogen, which process comprises passing said gases, under increased pressure, through an absorption column in counter-current flow with relatively cold, strong nitric acid maintained at a temperature not lower than —20° C., heating the resulting solution of oxides of nitrogen dissolved in said nitric acid, treating said heated solution with an oxygen-containing gas consisting substantially of air, whereby to produce nitric acid of a concentration of at least 70% strength, and cooling a portion of said strong nitric acid produced in said process, and returning said cooled portion for the absorption of oxides of nitrogen from said air, after passage through said heated solution.

11. The process of making nitric acid from gases containing oxides of nitrogen, which process comprises absorbing said oxides of nitrogen, under super-atmospheric pressure, in relatively cold, strong nitric acid of a concentration of at least 70% strength, to produce a solution of oxides of nitrogen therein, heating said resulting solution to reaction temperature, treating said heated solution with a gas consisting substantially of air maintained at super-atmospheric pressure, to convert said dissolved oxides of nitrogen to nitric acid, and scrubbing the air, after passage through the heated solution with the body of relatively cold, strong nitric acid in which said oxides of nitrogen are absorbed.

12. The process of making nitric acid from gases containing oxides of nitrogen, which process comprises absorbing said oxides of nitrogen, under super-atmospheric pressure in relatively cold, strong nitric acid of a concentration of at least 70% strength, to produce a solution of oxides of nitrogen therein, heating said resulting solution to reaction temperature, passing said heated solution counter-current to a gas consisting substantially of air, maintained at super-atmospheric pressure, to convert said dissolved oxides of nitrogen to nitric acid, and scrubbing the air, after passage through said heated solution, together with the aforesaid gases containing oxides of nitrogen, with said relatively cold, strong nitric acid.

13. The process of making nitric acid from gases containing oxides of nitrogen, which process comprises cooling said gases to condense at least a portion of the oxides of nitrogen from said gases, the remainder thereof being uncondensed, combining said condensed oxides of nitrogen with a solution of oxides of nitrogen in strong nitric acid maintained at 30° to 90° C., passing said solution counter-current to a gas substantially comprising air maintained at super-atmospheric pressures, to convert said dissolved oxides of nitrogen to nitric acid, scrubbing the aforesaid uncondensed gases, together with the air, after passage through said solution of oxides of nitrogen, with relatively cold, strong nitric acid of a concentration of at least 70% strength, whereby to absorb the gaseous oxides of nitrogen from said combined gases, heating said relatively cold, strong nitric acid after the solution therein of said oxides of nitrogen contained in said combined gases, to 30° to 90° C., and combining said heated nitric acid solution with said condensed oxides of nitrogen as aforesaid, whereby to produce nitric acid having a concentration in excess of 75%.

14. The process of making nitric acid from gases containing oxides of nitrogen, water vapor, and an inert gas, which process comprises partially cooling said gases to condense the water therefrom, separating the partially cooled uncondensed gases from said condensed water, cooling said partially cooled uncondensed gases still further to condense at least a portion of said oxides of nitrogen from said gases, the remainder thereof being uncondensed, combining said condensed oxides of nitrogen with a solution of oxides of nitrogen in strong nitric acid maintained at 60° to 70° C., passing said solution counter-current to a gas substantially comprising air, maintained at 5 to 50 atmospheres, to convert said dissolved oxides of nitrogen to nitric acid, scrubbing the aforesaid uncondensed gas, together with the air, after passage through said solution of oxides of nitrogen, with relatively cold, strong nitric acid of a concentration of at least 70% strength, whereby to absorb the gaseous oxides of nitrogen from said combined gases, heating said relatively cold, strong nitric acid after the solution therein of said oxides of nitrogen contained in said combined gases, to 60° to 70° C., and combining said heated nitric acid solution with said condensed oxides of nitrogen as aforesaid, whereby to produce nitric acid having a concentration in excess of 75%.

15. The process of making nitric acid from gases containing oxides of nitrogen, water vapor, and an inert gas, which process comprises partially cooling said gases to condense the water therefrom, separating the partially cooled uncondensed gases from said condensed water, cooling said partially cooled uncondensed gases still further to condense at least a portion of said oxides of nitrogen from said gases, the remainder of said oxides of nitrogen being uncondensed, combining said condensed oxides of nitrogen with a solution of oxides of nitrogen in strong nitric acid maintained at 60° to 70° C., passing said solution counter-current to a gas substantially comprising air, maintained at 5 to 50 atmospheres, to convert said dissolved oxides of nitrogen to nitric acid, scrubbing the aforesaid uncondensed gas, together with the air, after passage through said solution of oxides of nitrogen, with relatively cold, strong nitric acid, to absorb the gaseous oxides of nitrogen from said combined gases, heating said relatively cold, strong nitric acid after the solution therein of said oxides of nitrogen contained in said combined gases, to 60° to 70° C., and combining said heated nitric acid solution with said condensed oxides of nitrogen as aforesaid, whereby to produce nitric acid having a concentration in excess of 75%, a portion of the strong nitric acid thus produced being cooled and employed to scrub said combined gases as aforesaid.

STANLEY L. HANDFORTH.